(12) United States Patent
Kuroishi et al.

(10) Patent No.: US 10,477,043 B2
(45) Date of Patent: Nov. 12, 2019

(54) DOCUMENT PROCESSING APPARATUS AND NON-TRANSITORY COMPUTER READABLE MEDIUM FOR KEYWORD EXTRACTION DECISION

(71) Applicant: FUJI XEROX CO., LTD., Tokyo (JP)

(72) Inventors: Kenji Kuroishi, Kanagawa (JP); Chigusa Nakata, Kanagawa (JP); Hiroshi Honda, Kanagawa (JP); Eiji Nishi, Kanagawa (JP); Yoshihiro Sekine, Kanagawa (JP); Hiroshi Mikuriya, Kanagawa (JP); Takeshi Furuya, Kanagawa (JP); Ryuichi Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 158 days.

(21) Appl. No.: 15/783,099

(22) Filed: Oct. 13, 2017

(65) Prior Publication Data

US 2018/0262635 A1 Sep. 13, 2018

(30) Foreign Application Priority Data

Mar. 13, 2017 (JP) ................................. 2017-047551

(51) Int. Cl.
*G06K 9/00* (2006.01)
*H04N 1/00* (2006.01)
(Continued)

(52) U.S. Cl.
CPC ..... *H04N 1/00331* (2013.01); *G06F 17/2765* (2013.01); *G06K 9/00456* (2013.01);
(Continued)

(58) Field of Classification Search
CPC ............ G06F 17/2765; G06K 9/00456; G06K 9/00469; G06K 9/20; G06T 7/0002; G06T 2207/30176
See application file for complete search history.

(56) References Cited

U.S. PATENT DOCUMENTS 8,438,630 B1 * 5/2013 Clifford .................. G06F 21/60
375/240.02
9,002,838 B2 * 4/2015 Pitzo ...................... G06Q 40/02
707/730
(Continued)

FOREIGN PATENT DOCUMENTS

JP 2008-271534 A 11/2008
JP 2008-288799 A 11/2008
JP 2014-182741 A 9/2014

*Primary Examiner* — Yubin Hung
(74) *Attorney, Agent, or Firm* — Sughrue Mion, PLLC (57) ABSTRACT

A document processing apparatus includes an image processing unit, a target determination unit, a text reading unit, and a keyword extraction unit. The image processing unit processes an image. The target determination unit determines whether an image that is a target of a process executed by the image processing unit is to be used as a keyword extraction target. The text reading unit reads a text from the image processed by the image processing unit. The keyword extraction unit extracts a keyword from the text read by the text reading unit from an image determined to be a keyword extraction target by the target determination unit.

10 Claims, 5 Drawing Sheets

(51) Int. Cl.
*G06T 7/00* (2017.01)
*G06K 9/20* (2006.01)
*G06F 17/27* (2006.01)

(52) U.S. Cl.
CPC ........... *G06K 9/00469* (2013.01); *G06K 9/20* (2013.01); *G06T 7/0002* (2013.01); *G06T 2207/30176* (2013.01)

(56) References Cited

U.S. PATENT DOCUMENTS

| | | | | |
|---|---|---|---|---|
| 2003/0007397 | A1* | 1/2003 | Kobayashi | G06F 17/24 365/200 |
| 2005/0257140 | A1* | 11/2005 | Marukawa | G06F 17/218 715/255 |
| 2006/0053154 | A1* | 3/2006 | Yano | G06F 16/90324 |
| 2008/0243818 | A1 | 10/2008 | Ming | |
| 2009/0030939 | A1* | 1/2009 | Terao | G03G 21/046 |
| 2012/0033244 | A1* | 2/2012 | Kohno | G06F 21/608 358/1.14 |
| 2012/0189340 | A1* | 7/2012 | Hagiwara | B41J 2/32 399/82 |
| 2012/0240243 | A1* | 9/2012 | Allardyce | G06Q 10/10 726/28 |
| 2017/0046525 | A1* | 2/2017 | Balinsky | G06F 9/38 |
| 2017/0262545 | A1* | 9/2017 | Qu | G06F 16/955 |

\* cited by examiner

DOCUMENT PROCESSING APPARATUS AND NON-TRANSITORY COMPUTER READABLE MEDIUM FOR KEYWORD EXTRACTION DECISION

CROSS-REFERENCE TO RELATED APPLICATIONS

This application is based on and claims priority under 35 USC 119 from Japanese Patent Application No. 2017-047551 filed Mar. 13, 2017.

BACKGROUND

Technical Field

The present invention relates to a document processing apparatus and a non-transitory computer readable medium.

SUMMARY

A conceivable way of revealing matters of interest in an office or a company is extracting keywords from documents exchanged in the office or the company and then studying the keywords. However, since a large number of documents, including digitized documents such as e-mail, are exchanged in the office nowadays, extracting keywords without selecting from among the documents often leads to extracting words of little consequence as keywords.

According to an aspect of the invention, there is provided a document processing apparatus including an image processing unit, a target determination unit, a text reading unit, and a keyword extraction unit. The image processing unit processes an image. The target determination unit determines whether an image that is a target of a process executed by the image processing unit is to be used as a keyword extraction target. The text reading unit reads a text from the image processed by the image processing unit. The keyword extraction unit extracts a keyword from the text read by the text reading unit from an image determined to be a keyword extraction target by the target determination unit.

BRIEF DESCRIPTION OF THE DRAWINGS

An exemplary embodiment of the present invention will be described in detail based on the following figures, wherein.

DETAILED DESCRIPTION

Exemplary Embodiment Applied to System

Hereinafter, an exemplary embodiment of the present invention will be described in detail with reference to the attached drawings.

Figure 1:
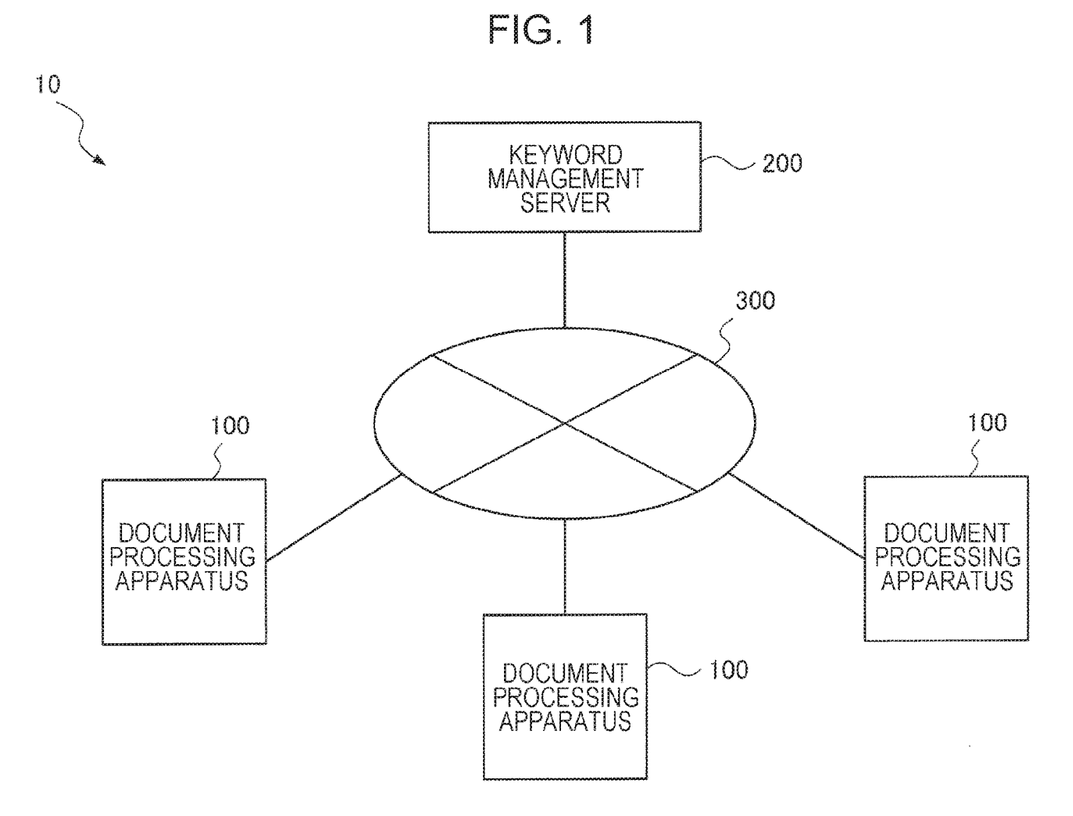
FIG. 1 is a diagram illustrating the configuration of a keyword extraction system to which the exemplary embodiment is applied.

FIG. 1 is a diagram illustrating the configuration of a keyword extraction system 10 to which the exemplary embodiment is applied. As illustrated in FIG. 1, the keyword extraction system 10 of the exemplary embodiment includes one or more document processing apparatuses 100 that each process a document and extract one or more keywords and a keyword management server 200 that manages each extracted keyword.

In the exemplary embodiment, the term "document" denotes a document that is not expressed in computer readable character encoding (in other words, not described as text data). Specifically, examples of such a document include a document obtained by printing on a medium such as paper by using an image forming material such as toner and a hand-written document. An electronic data file including characters recorded as an image is also considered a "document" in the exemplary embodiment. In particular, a document to be discriminated from a document expressed using computer readable character encoding is referred to as a "document in a format other than text data", a "document not having undergone digitization", or the like. A document expressed in computer readable character encoding is referred to as an "electronic document", a "digitized document", or the like.

Each document processing apparatus 100 extracts one or more keywords from a document. The document processing apparatus 100 has a function of handling a document in a format other than text data (hereinafter, a process executed on a document by using this type of function is referred to as a "document process" in some cases). Examples of the document processing apparatus 100 include a printer, a scanner, a copier, a fax machine, a multifunctional printer having the combined functions of these, and a projector that projects an image. In other words, a typical example of the document processing apparatus 100 is an image processing apparatus that processes a document formed as an image (including an image formed on a medium and a digitized data image). When analyzing documents and extracting a keyword, the document processing apparatus 100 also acquires related information (such as the type or the number of documents including the keyword and the frequency of the keyword on a per document basis) and transmits the related information together with the extracted keyword to the keyword management server 200.

The keyword management server 200 is implemented by a computer. The one or more document processing apparatuses 100 are connected to the keyword management server 200. The keyword management server 200 receives and manages each keyword extracted by the corresponding document processing apparatus 100 and the related information. In the configuration illustrated in FIG. 1, the keyword management server 200 is connected to the one or more document processing apparatuses 100 via a network 300. The network 300 is not particularly limited to a specific network as long as the network 300 is a communication network used for data communication between apparatuses. For example, the network 300 may be the Internet, a local area network (LAN), a wide area network (WAN), or another network. In other words, the keyword management server 200 may be a local server built up on a LAN or may be a so-called cloud server built up on the Internet. One of the document processing apparatuses 100 may also function as the keyword management server 200. The communication network used for the data communication may be a wired or wireless network. In addition, the configuration may include apparatuses connected via multiple networks or communication lines.

Figure 2:
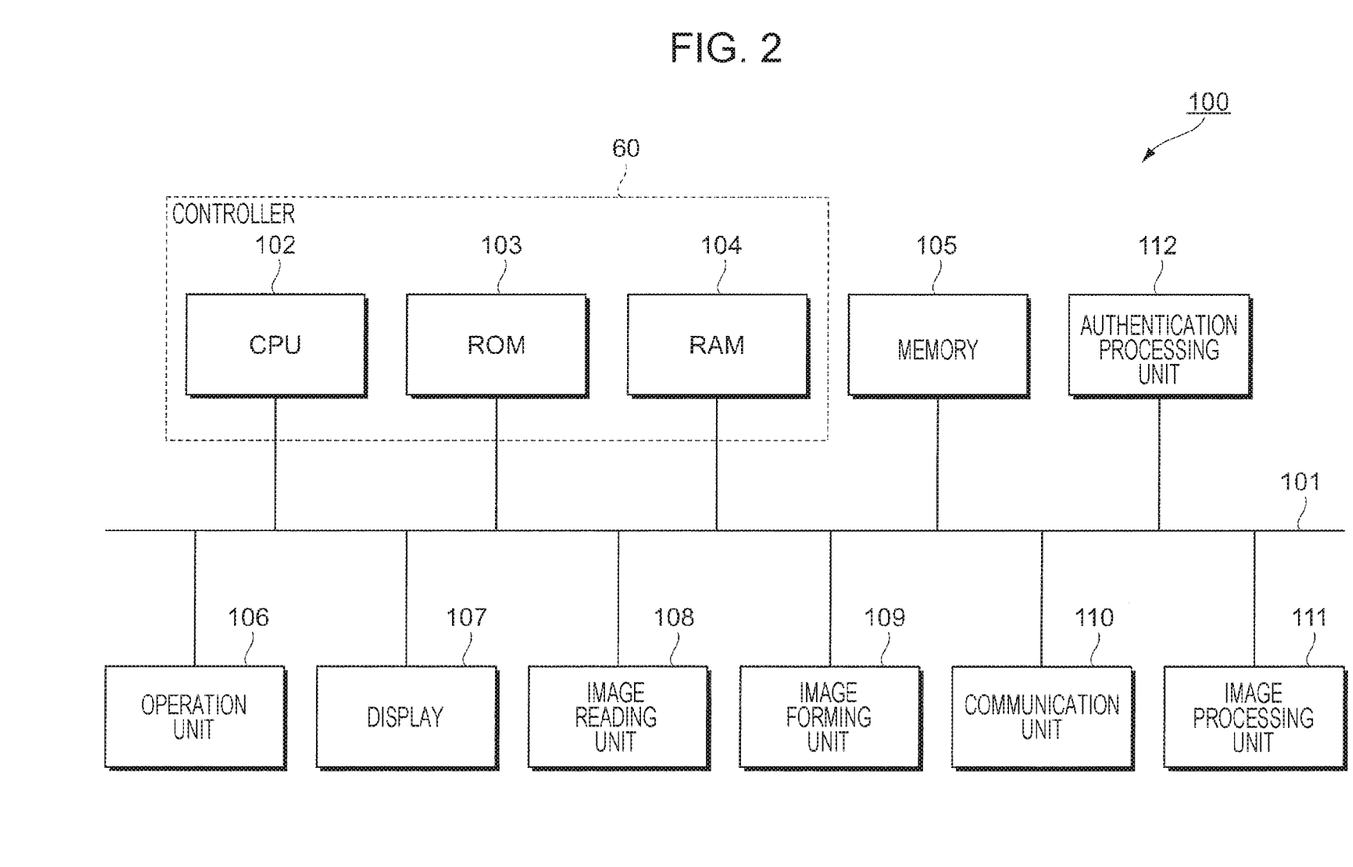
FIG. 2 is a diagram illustrating the functional configuration of a multifunctional printer that is an example of a document processing apparatus.

FIG. 2 is a diagram illustrating the functional configuration of a multifunctional printer that is an example of the document processing apparatuses 100. In the configuration illustrated in FIG. 2, each document processing apparatus 100 includes a central processing unit (CPU) 102 constituting a controller 60, a read only memory (ROM) 103, and a random access memory (RAM) 104. The document processing apparatus 100 also includes a memory 105, an operation unit 106, a display 107, an image reading unit 108, an image forming unit 109, a communication unit 110, an image processing unit 111, and an authentication processing unit 112. These functional units are connected to a bus 101 and exchange data via the bus 101.

The operation unit 106 receives an operation performed by a user (operator). The operation unit 106 is composed of, for example, keys as hardware. The operation unit 106 is composed of, for example, a touch sensor that outputs a control signal in accordance with a pressed position. The operation unit 106 may be composed of a touch panel obtained by combining the touch sensor and a liquid crystal display constituting the display 107 (described later).

The display 107 is an example of a display and composed of, for example, the liquid crystal display. The display 107 displays information regarding the document processing apparatus 100 under the control of the CPU 102. The display 107 also displays a menu screen referred to by the user when they operate the document processing apparatus 100. Specifically, the display 107 and the operation unit 106 are combined with each other and function as a user interface unit of the document processing apparatus 100. In the exemplary embodiment, the display 107 displays information regarding a keyword under the control of a display controller 64 (described later).

The image reading unit 108 is composed of a scanner, for example. The image reading unit 108 optically reads, as one of multiple document processes, an image of the original set in the image reading unit and generates a read image (image data). To read an image, for example, a charge coupled device (CCD) method or a contact image sensor (CIS) method is used. In the CCD method, a CCD receives light in such a manner that the light is radiated from a light source, reflected on a document, and reduced by a lens. In the CIS method, a CIS receives light in such a manner that light beams are serially radiated from a light emitting diode (LED) light source and reflected on a document.

The image forming unit 109 is an example of an image forming unit. The image forming unit 109 forms, as one of the document processes, an image based on image data on a sheet of paper that is an example of a recording material by using an image forming material. To form an image on the recording material, an electrophotographic system, an inkjet system, or the like is used. In the electrophotographic system, an image is formed in such a manner that toner caused to be attached to a photoconductor is transferred onto a recording material. In the inkjet system, an image is formed in such a manner that ink is discharged onto a recording material.

The communication unit 110 includes a network interface for connecting to the keyword management server 200 and the other document processing apparatuses 100 via the network 300. The communication unit 110 also has a function of connecting to a telephone network for fax transmission and reception as one of the document processes.

The image processing unit 111 includes a processor that is an arithmetic unit and a work memory and performs image processing such as color correction and tone correction on an image represented in accordance with the image data. Note that the CPU 102 of the controller 60 may serve as the processor, and the RAM 104 of the controller 60 may serve as the work memory.

The authentication processing unit 112 authenticates an operator who uses the functions of the document processing apparatus 100. The method for authenticating an operator is not particularly limited to a specific method. For example, an authentication process may be executed in such a manner that a device having a function of reading an integrated circuit (IC) card is disposed on the enclosure of the document processing apparatus 100 and reads information regarding the identification (ID) of the operator (ID information) that is recorded in the IC card. The authentication process may also be executed on the basis of the ID information input in such a manner that the operator operates the operation unit 106. In a case where the operator operates the document processing apparatus 100 from an external device through remote control, the authentication process may be executed by using the authentication information input through access from the external device to the document processing apparatus 100. Other various existing authentication methods may also be applied. Note that the function of the authentication processing unit 112 may be implemented in such a manner that the CPU 102 of the controller 60 runs a program stored in the ROM 103 of the controller 60.

The memory 105 is an example of a memory and is composed of a memory device such as a hard disk device. The memory 105 stores therein a data image such as a read image generated by the image reading unit 108. Further, the memory 105 of the exemplary embodiment functions as a keyword-information holding unit that holds information regarding a keyword extracted from a document that is a target of one of the above-described document processes.

Regarding the CPU 102, the ROM 103, and the RAM 104 constituting the controller 60, the ROM 103 stores therein the program to be run by the CPU 102, and the CPU 102 reads the program stored in the ROM 103 and runs the program by using the RAM 104 as a work area. A program stored in the memory 105 may also be loaded in the RAM 104, and the CPU 102 may run the program loaded in the RAM 104. When running the program, the CPU 102 thereby controls, as the controller 60, the functional units of the document processing apparatus 100. In the exemplary embodiment, the controller 60 implements the function for extracting the keyword from the document and managing the keyword.

Functional Configuration of Controller

Figure 3:
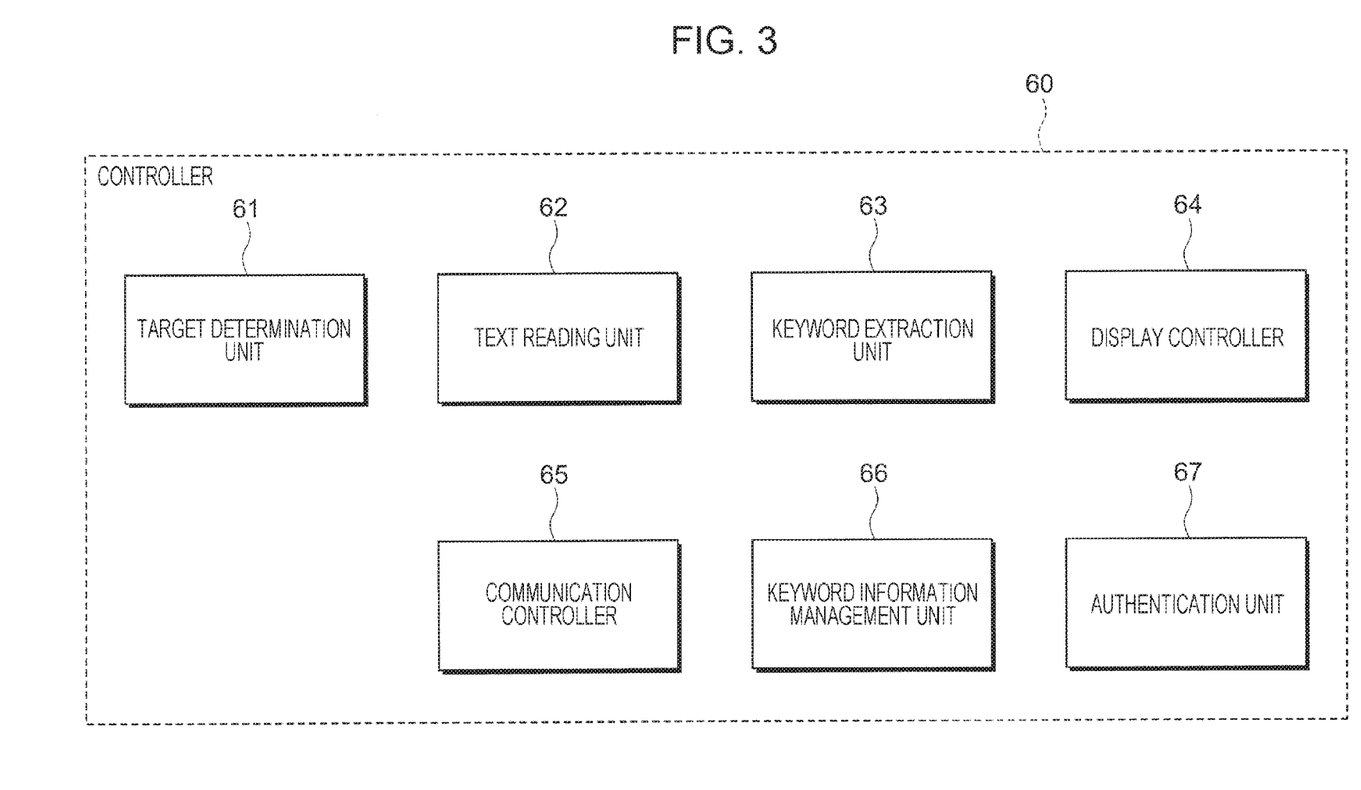
FIG. 3 is a diagram illustrating the functional configuration of a controller.

FIG. 3 is a diagram illustrating the functional configuration of the controller 60. A target determination unit 61, a text reading unit 62, a keyword extraction unit 63, the display controller 64, a communication controller 65, a keyword information management unit 66, and an authentication unit 67 are implemented by software and hardware resources in corporation with each other. Specifically, in the exemplary embodiment, the operating system and application programs running in cooperation with the operating system are stored in the ROM 103 (see FIG. 2) and the memory 105. In the exemplary embodiment, the CPU 102 loads the programs from the ROM 103 or the like in the RAM 104 that is a main memory and runs the programs, and the controller 60 thereby functions as the target determination unit 61, the text reading unit 62, the keyword extraction unit 63, the display controller 64, the communication controller 65, the keyword information management unit 66, and the authentication unit 67.

The programs to be run by the CPU 102 may be provided to the document processing apparatus 100 in such a manner as to be stored in a computer readable recording medium such as a magnetic recording medium (such as a magnetic disk), an optical recording medium (such as an optical disk), or a semiconductor memory or may be provided via a network such as the Internet.

The target determination unit 61 determines whether a document processed by the document processing apparatus 100 (having undergone a document process) is to be used as a keyword extraction target. In other words, a document to be used as a keyword extraction target is separated from the other documents in accordance with a predetermined condition (determination condition). The target determination unit 61 determines whether the document is to be used as the keyword extraction target by using various methods in accordance with the content of the document, the form of recording the document, the type of medium used for the recording, the type of process (document process) executed on the document, and the like. Specific determination methods will be described later.

The text reading unit 62 reads a document selected by the target determination unit 61 and generates text data for extracting a keyword. In other words, the text reading unit 62 converts a document not having undergone digitization to a digitized document. In a case where the document process executed by the document processing apparatus 100 is document image reading, a document processed is formed on a medium such as paper. In this case, the document formed on the medium is read, for example, in an optical character recognition/reader (OCR) process. In a case where the document process executed by the document processing apparatus 100 is printing output or the like based on electronic data having characters recorded as an image, a document is read, by executing, for example, a character recognition process on the image loaded in the memory. In a case where the document process executed by the document processing apparatus 100 is printing output of an electronic document described in page description language (PDL), the electronic document described in PDL includes text data, and thus the text data may be directly extracted. The text data may also be generated by using one of various existing methods in accordance with a character recording method used for the document.

The keyword extraction unit 63 extracts, from a document determined as a keyword extraction target by the target determination unit 61, a keyword on the basis of the text data generated by the text reading unit 62. The keyword extraction unit 63 may classify documents on the basis of the result of determination performed by the target determination unit 61, the result of reading performed by the text reading unit 62, and the like and may extract keywords on a per classification basis or by using different conditions (extraction conditions) or methods for the respective classifications. Further, the keyword extraction unit 63 stores, in a memory such as the memory 105 or the RAM 104, the extracted keywords and various pieces of related information (such as the frequency of each keyword, an extraction date and time, and the classification of extraction target document) acquired when extracting the keywords. Note that various existing methods for extracting a keyword may be used.

The display controller 64 reads the information regarding the corresponding keyword extracted by the keyword extraction unit 63 (for example, a keyword list or related information regarding the keyword) from the memory such as the memory 105 and displays the information on the display screen of the display 107. The display controller 64 performs display control of the information regarding the keyword after receiving a display instruction given through an operation of the menu, for example, by using the operation unit 106 and the display 107.

The communication controller 65 controls the communication unit 110, accesses the keyword management server 200, and transmits information regarding a keyword stored in the memory such as the memory 105. In a case where the multiple document processing apparatuses 100 extract keywords and calculate classification totals, the communication controller 65 controls the communication unit 110, accesses the other document processing apparatuses 100, and exchange the information regarding the extracted keyword with the other document processing apparatuses 100. Pieces of information regarding the keywords extracted by the multiple document processing apparatuses 100 are stored in the memory of the corresponding document processing apparatus 100 and are thereby shared.

The keyword information management unit 66 manages the information regarding the keyword extracted by the keyword extraction unit 63 and stored in the memory such as the memory 105. In the case where the multiple document processing apparatuses 100 extract keywords and calculate classification totals, each document processing apparatus 100 calculates a classification total of the information regarding the keywords extracted by the document processing apparatus 100 and the information regarding the keywords acquired from the other document processing apparatuses 100 through the communication controller 65 and manages the information.

Keyword Extraction Target Determination Method Performed by Target Determination Unit 61

In the exemplary embodiment, whether a document processed by the document processing apparatus 100 (having undergone a document process) is to be used as a keyword extraction target is determined in accordance with a determination condition set on the basis of various items such as the content of the document and the type of document process executed on the document by the document processing apparatus 100. Hereinafter, the determination conditions will be described by taking examples.

Determination Based on Content of Document

In the exemplary embodiment, whether to use a document as a target of keyword extraction to be performed by the target determination unit 61 may be determined on the basis of the content of the document. In this case, for example, the text reading unit 62 executes a process on the document and generates text data. The target determination unit 61 verifies whether the generated text data includes a specific word or character string (hereinafter, a specific character string). Examples of such a specific character string include a character string such as "Confidential" or "Top Secret Information" and a specific logo representing a company name or the like. These character strings generally denote that the document has a specific characteristic (a specific status). Specifically, the document is a confidential document, a public document, or the like. Accordingly, a document having such a specific character string is used as a keyword extraction target or excluded from the keyword extraction target in accordance with the type of detected specific character string. For example, since a document including the character string "Confidential" or "Top Secret Information" is a special document, a word satisfying a keyword extraction condition (such as high frequency usage) in the document is considered to have a tendency different from the tendency of words in the other documents. In addition, the document is handled by limited persons, and thus the word extracted as a keyword is likely to appear frequently only in a document exchanged by specific persons in the office or the company. Hence, in accordance with the purpose of keyword extraction, only a document including the specific character string may be used as a keyword extraction target, or the document including the specific character string may be excluded from the keyword extraction target. Further, specific character strings may be classified, and results of the keyword extraction may be classified and managed for each type of classified specific character string.

The specific character string has a different meaning in some cases depending on the use thereof in the document. Accordingly, whether to extract a keyword may be determined differently depending on whether the specific character string is used in a predetermined specific form or in a different form.

Figure 4A:
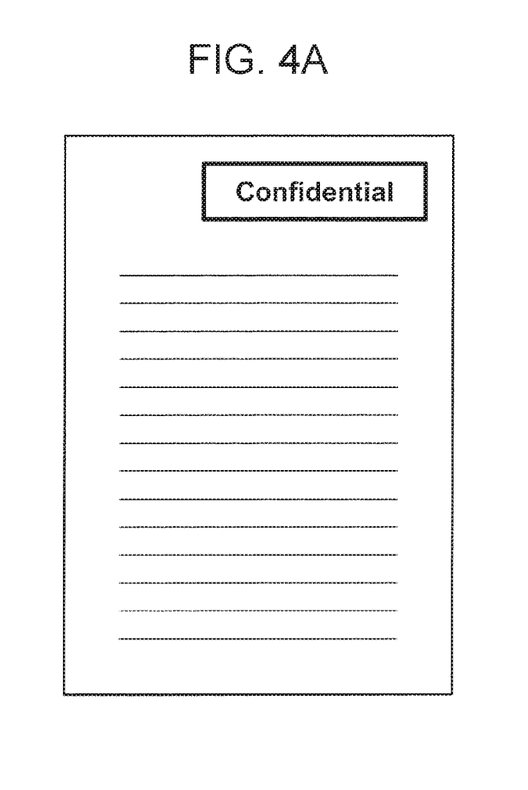
FIGS. 4A and 4B are diagrams each explaining a form of a specific character string in a document, FIG. 4A illustrating an example of a form of a specific character string indicating the status of the document, FIG. 4B illustrating an example of using a word corresponding to the specific character string as content of the document.
Figure 4B:
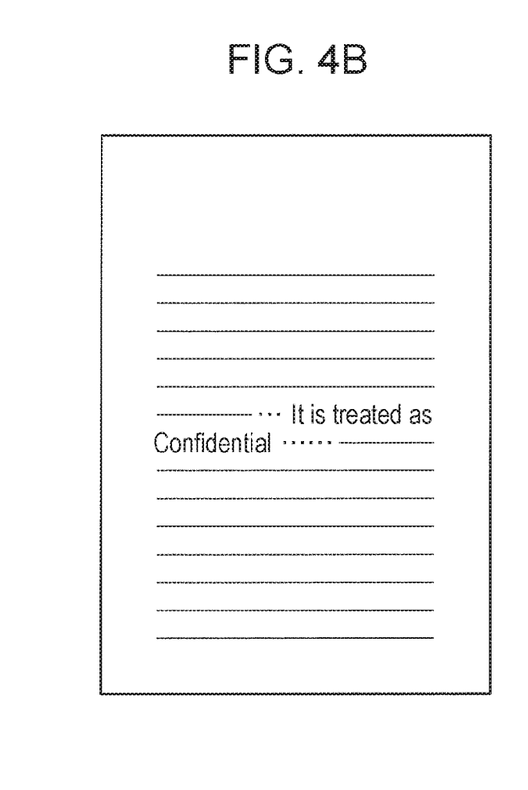

FIGS. 4A and 4B are diagrams each explaining a form of a specific character string in a document. FIG. 4A is a diagram illustrating an example of a form of a specific character string indicating the status of the document. FIG. 4B is a diagram illustrating an example of using a word corresponding to the specific character string as content of the document. As illustrated in FIG. 4A, in a case where a specific character string ("Confidential" in the example in FIG. 4A) representing the status of the document is stated in a specific form, this denotes that the document is a special document to be handled as represented by the specific character string. Accordingly, as described above, by using a condition in which the specific character string is stated, the document may be used as a keyword extraction target, excluded from the keyword extraction target, or extracted in such a manner as to be distinguished from the other documents. In contrast, as illustrated in FIG. 4B, suppose a case where a word corresponding to the specific character string ("Confidential" in the example in FIG. 4B) is included in a document but is used as the content of the document. In this case, the word is merely used in the document and does not represent the status of the document. Accordingly, in this case, the document does not undergo special handling based on the condition in which the specific character string is stated and is handled in the same manner as the other documents.

The form in which a character string is handled as the specific character string may be set on the basis of the form of the character string itself or the form of a recording medium. Examples of the form include a character string in a predetermined font, size, color, or the like and a character string located in a specific position on the paper. Not only a character string output by printing but also a character string formed by stamping may be used as the specific character string.

Figure 5:
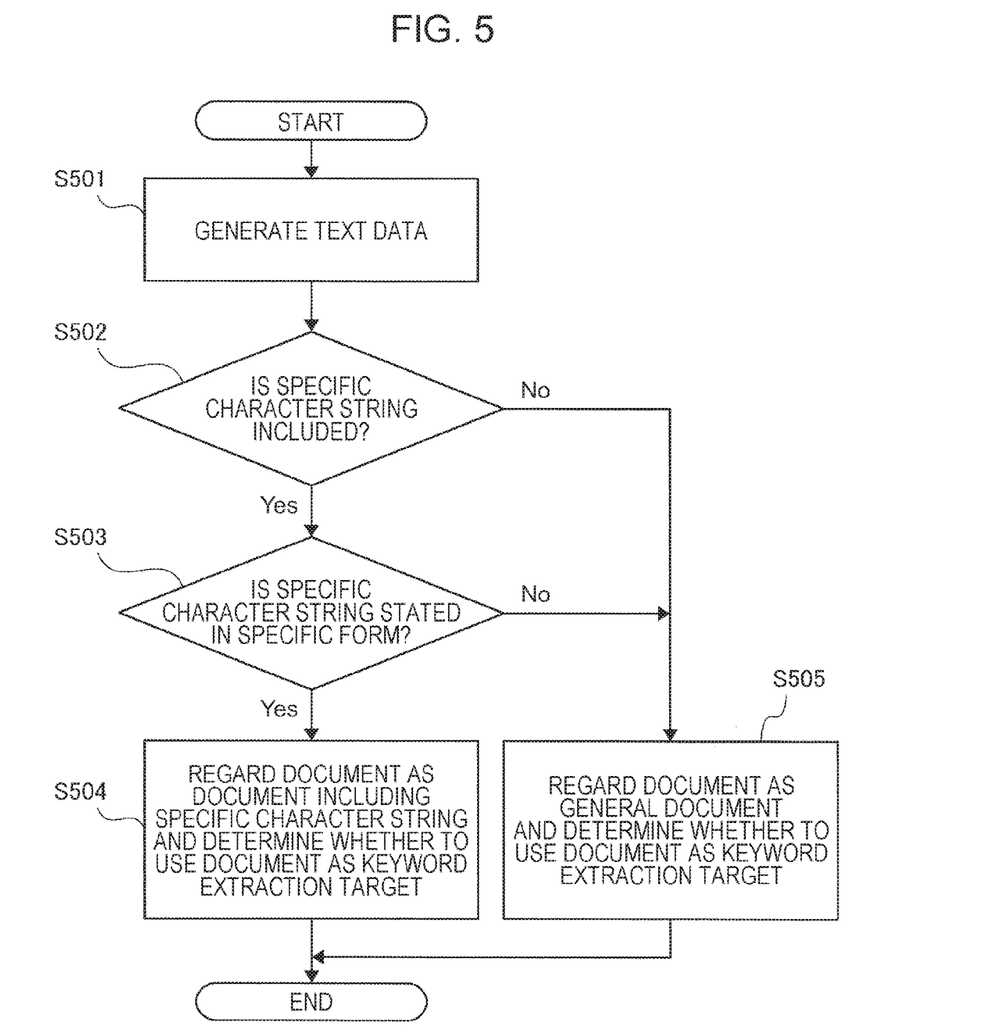
FIG. 5 is a flowchart illustrating operations performed by a target determination unit and a text reading unit in a case where keyword extraction target determination is performed on the basis of a specific character string.

FIG. 5 is a flowchart illustrating operations performed by the target determination unit 61 and the text reading unit 62 when keyword extraction target determination is performed on the basis of a specific character string. As illustrated in FIG. 5, the text reading unit 62 first executes a character recognition process on a document image, for example, read by the image reading unit 108 and generates text data (S501). The target determination unit 61 analyzes the text data generated by the text reading unit 62 and determines whether a specific character string is included (S502). If a specific character string is included (Yes in S502), the target determination unit 61 then determines whether the detected specific character string is stated in a specific form (S503).

If a specific character string is stated in a specific form (Yes in S503), the target determination unit 61 regards the determination target document as a document including a specific character string and determines whether to use the determination target document as a keyword extraction target (S504). If a specific character string is not included in the determination target document (No in S502), or if a specific character string is included in the determination target document but is not stated in a specific form (No in S503), the target determination unit 61 regards the determination target document as a general document not including a specific character string and determines whether to use the determination target document as a keyword extraction target (S505).

In the above-described operation example, the text data is first generated by the text reading unit 62 for the determination target document, and whether the text data includes the specific character string is verified. However, since a specific character string stated in a specific form appears in a specific character shape or at a specific position, pattern recognition for a specific form may be performed before the character recognition, and the presence of the specific character string may thereby be determined directly.

Determination Based on Document Recording Form

In the exemplary embodiment, the target determination unit 61 may determine whether to use a document as a keyword extraction target on the basis of the form of recording the document. For example, in a case where a specific format of a document or a specific layout of sentences or figures is predetermined, it is possible to identify the status of the document on the basis of only the format or the layout without acquiring the content of the document. In this case, the type of document read by the image reading unit 108 may be identified in such a manner that the format or layout of the document image is identified without the character string recognition to be performed by the text reading unit 62, and whether to use the document as a keyword extraction target may be determined in accordance with the identified type of document. Results of keyword extraction may also be classified and managed on the basis of identified types of documents.

Further, it is conceivable that the target determination unit 61 determines whether to use a document as a keyword extraction target on the basis of the color of paper on which the document is recorded. Specifically, if paper of a specific color is predetermined for generating a specific document, it is possible to identify the type of document by identifying the color of the paper. Accordingly, the type of document may be identified on the basis of the color of paper on which the document image read by the image reading unit 108 is recorded, and whether to use the document as the keyword extraction target may be determined on the basis of the identified type of document. Results of keyword extraction may also be classified and managed on the basis of identified types of documents.

Determination Based on Type of Document Process Performed on Document Image

In the exemplary embodiment, the target determination unit 61 may determine whether to use a document as a keyword extraction target differently depending on the type of document process executed on the document image. For example, a document received by fax is a document received from an external apparatus and is thus highly likely to be irrelevant to internal interests of the office or the company. Accordingly, for example, among documents having undergone processes using a fax function of the functions of the multifunctional printer, a document transmitted by fax is used as a keyword extraction target, and a document received by fax is excluded from the keyword extraction target. Likewise, in the case of a copying function, for example, the target determination unit 61 determines whether to use a document as a keyword extraction target differently depending on the number of copies. Conditions may each be set in accordance with the type of corresponding document process performed on a document image, and whether to use a document as a keyword extraction target may be determined on the basis of the condition. Results of keyword extraction may also be classified and managed on the basis of types of document processes executed on document images.

Keyword Weighting Based on Document Process Type

Weighting of a keyword on the basis of the type of document process will be described. In a case where the document processing apparatus 100 such as the multifunctional printer is used in the office or the like, the types of document process executed in accordance with the use of a document are considered type-specific in many cases. For example, to collect general information from sites on an external network such as the Internet, or to search a database, hypertext markup language (HTML) documents are often browsed. To exchange information with a customer or a client, documents are often faxed or e-mailed. To generate and edit a formatted document describing a proposal or a problem for a job or a work task, document-editing application software such as a word processor or presentation software is often used. To calculate a classification total of pieces of data used for a work task or the like or to edit the classification-total data, spreadsheet software is often used. To generate or edit a simple document such as a memorandum or software source code, text editor software is often used. To refer to a document or a report acquired from a site on an external network such as the Internet, a portable document format (PDF) document is often browsed. Note that the relationships between the use and the document process are merely examples, and various characteristics are considered to be observed depending on the use environment of the document processing apparatus 100.

Accordingly, in accordance with the purpose of keyword extraction and the type of document process involving the keyword extraction, the keyword extraction unit 63 may perform weighting on an extracted keyword on the basis of the relationship between the use as described above and the document process. For example, suppose a case where a keyword is extracted to locate a problem or a proposal of interest in the office. In this case, heavy weighting is applied to a keyword extracted when a process using the document processing apparatus 100 is executed on a document generated by using document-editing application software that is often used for generation or the like of a formatted document. Light weighting is applied to a keyword extracted when a process using the document processing apparatus 100 is executed on a PDF document that is less likely to be used for generation or the like of a formatted document. If a process using the document processing apparatus 100 is executed on an HTML document that is unlikely to be used for generation or the like of a formatted document, the document is excluded from the keyword extraction target.

As another example, suppose a case where a keyword is extracted when information is exchanged with a client or a customer. In this case, heavy weighting is applied to a keyword extracted when e-mailing or fax transmission and reception that is often used for information exchange with the client or the customer is performed. Medium weighting is applied to a keyword extracted when a process using the document processing apparatus 100 is executed on a document that is generated by using document-editing application software and that is likely to be used as a material to be presented to the client or the customer. If a process using the document processing apparatus 100 is executed on a PDF or HTML document that is not used for information exchange with the client or the customer, the document is excluded from the keyword extraction target.

As another example, suppose a case where a keyword is extracted to reveal a matter that is of general interest to employees. In this case, the matter of general interest to employees is considered to be acquired from, for example, a site on the Internet. Accordingly, heavy weighting is applied to a keyword extracted when a process using the document processing apparatus 100 is executed on an HTML or PDF document.

As described above, weighting is performed on an extracted keyword in accordance with the purpose of keyword extraction and the type of document process involving the keyword extraction, and the accuracy of keyword extraction meeting the purpose of the extraction is thereby increased. Note that the weighting based on the relationship between the above-described use and the document process is merely an example, and actually, the value of the weighting may be specifically set in accordance with the use environment of the document processing apparatus 100, the purpose of keyword extraction, and the like.

Determination Based on Operator

In the exemplary embodiment, the target determination unit 61 may determine whether a document image is to be used as a keyword extraction target differently depending on the operator who performs an operation of a document process on the document image. The document processing apparatus 100 authenticates the operator and thereby identifies the operator who performs the operation of the document process on the document image. If identical operations are performed, whether to use each document image as a keyword extraction target may be determined in accordance with the operator who performs the corresponding operation. Results of keyword extraction may also be classified and managed on the basis of operators who perform respective operations. Extraction of different keywords depending on departments and posts are thereby expected.

Keyword Weighting Based on Operator

Keyword weighting based on the operator will be described. When keywords are extracted, various purposes for extracting the keyword are set and include acquiring opinions in the workplace, acquiring a keyword related to management, and the like. In the description above, the target determination unit 61 determines whether to use a document image as a keyword extraction target in accordance with the operator who performs the operation, and thus the keyword extraction unit 63 may perform weighting on the keyword in accordance with the operator. For example, in a case where a keyword is extracted to acquire opinions in the workplace, heavy weighting is applied to a keyword extracted through an operation performed by a worker in the workplace or by an outsourced worker. In a case where a keyword is extracted to acquire a keyword related to management, heavy weighting is applied to a keyword extracted through an operation performed by a manager or the like. A document image acquired through an operation performed by an operator other than these operators (a different operator) is not excluded from the keyword extraction target, and a keyword is extracted with low weighting. The information regarding matters of another operator's interest meeting the purpose of keyword extraction is thereby collected.

Keyword Weighting Based on Type of Interface Used for Acquiring Document

If the document processing apparatus 100 that is a multifunctional printer is used, a document image that is a keyword extraction target is likely to be acquired in multiple ways such as via a network of a LAN or the like in the office, by reading the document image from a memory device, and by receiving the document image by fax. The route used in accordance with the type of document or a work task is considered route-specific in many cases. Accordingly, the keyword extraction unit 63 may perform weighting on an extracted keyword in accordance with the purpose of keyword extraction and the route of document image acquisition. The route of document image acquisition is identified by, for example, an interface used for acquiring the document image.

For example, the document processing apparatus 100 that is the multifunctional printer includes, as an interface for acquiring a document image, two types of connection units for wired communication (a first wired-connection unit and a second wired-connection unit), a wireless communication unit, and a connection unit for fax transmission and reception (fax connection unit). In addition, a document-image holding unit is provided as a kind of interface for acquiring a document image. The document processing apparatus 100 that is the multifunctional printer includes an internal memory serving as the document-image holding unit and an external memory including an attachable/detachable storage medium. A network connected to the first wired-connection unit is used by employees in the office as a communication unit used for outputting and reading a document by using the multifunctional printer, and a network connected to the second wired-connection unit is used as a communication unit used for a routine process such as regularly outputting and printing a recorded database. The wireless communication unit and the fax connection unit are communication units used when a person (from outside the office such as a general visitor) other than the employees in the office performs an operation of outputting or reading a document by using the multifunctional printer. The internal memory and the external memory are each used as the document-image holding unit when an employee in a different office performs an operation of outputting or reading a document by using the multifunctional printer.

Suppose a case where a keyword for internal interests of the office is to be acquired through extraction under the above-described operation circumstances. In this case, it is conceivable that, for example, heavy weighting is applied to a keyword extracted through an operation performed on a document image acquired via a device typically used by an employee in the office, and light weighting is applied to a keyword extracted through an operation performed on a document image acquired through a device typically used by a person other than the employees in the office. For example, in this case, heavy weighting is applied to a keyword extracted through an operation performed on a document image acquired via the first wired-connection unit. Note that a routine process executed on a database is not suitable for extracting a keyword because the same wording overwhelmingly appears a very large number of times in a target document. Accordingly, an operation performed on a document image acquired via the second wired-connection unit is excluded from a keyword extraction target. Note that a document image acquired through an operation performed by the person outside the office is not suitable for extracting a keyword for internal interests of the office but is not necessarily irrelevant because the operation has been performed by using the multifunctional printer in the office. Accordingly, light weighting is applied to the keyword extracted through the operation performed on the document image acquired via the wireless communication unit. A document image having undergone the operation performed by the employee in the different office is considered less useful as a keyword extraction target than the document image having undergone the operation performed by the employee in the office but more useful than the document image having undergone the operation performed by the person outside the office. Accordingly, medium weighting is applied to the keyword extracted through the operation performed on the document image read from the internal memory or the external memory.

As described above, performing the weighting leads to an increase of accuracy of extracting the keyword for a specific extraction purpose such as acquiring a keyword for internal interests of the office. Note that the operations of the multifunctional printer (document processing apparatus 100) and the weighting are merely examples, and the exemplary embodiment is not limited to the examples described above.

Cooperation Among Multiple Document Processing Apparatuses

In the exemplary embodiment, the multiple document processing apparatuses 100 may be connected to the keyword management server 200 as illustrated in FIG. 1. In a case where the keyword management server 200 manages keywords extracted by the multiple document processing apparatuses 100, the keyword management server 200 may classify results of the keyword extraction for each document processing apparatus 100 and calculate and manage classification-totals. In addition, control may be performed in such a manner that one or more document processing apparatuses 100 installed in a manager's office or a specific department do not extract a keyword. Cooperation among the multiple document processing apparatuses 100 may be combined with any of the above-described methods for determining whether to use a document image as a keyword extraction target, and thereby complex control may be performed in such a manner that a keyword is extracted only from a document having undergone a specific document process in a specific department or that only the document is excluded from the keyword extraction target.

The keyword management server 200 does not have to be provided, and the multiple document processing apparatuses 100 may exchange information regarding extracted keywords with each other and share the information. In this case, the document processing apparatuses 100 transmit or receive the information regarding the keywords, for example, at a predetermined time of the day and synchronize the held information.

Different Example of Document Processing Apparatus

The example illustrated in FIG. 2 has been described by taking as an example the case where the document processing apparatus 100 is applied to the multifunctional printer; however, the apparatus to which the document processing apparatus 100 is applicable is not limited to the multifunctional printer. In the exemplary embodiment, a keyword is extracted from a document involving conversion to an image, words of little consequence (so-called noise) are thereby reduced, and a keyword of consequence is thus extracted with high accuracy. Accordingly, any of various apparatuses that handle a document converted to an image may be used as the document processing apparatus 100. For example, a projector may be used as the document processing apparatus 100.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing apparatus comprising:
a memory configured to store program instructions; and
a processor configured to execute the instructions stored in the memory, that when executed comprise:
an image processing unit that processes an image;
a target determination unit that determines whether an image that is a target of a process executed by the image processing unit is to be used as a keyword extraction target;
a text reading unit that reads a text from the image processed by the image processing unit; and
a keyword extraction unit that extracts a keyword from the text read by the text reading unit from an image determined to be a keyword extraction target by the target determination unit.

2. The document processing apparatus according to claim 1,
wherein the target determination unit determines whether to perform keyword extraction depending on whether the text read by the text reading unit includes a specific character string that is predetermined.

3. The document processing apparatus according to claim 2,
wherein in a case where the specific character string is included in the text read from the image but is recorded in the image in a specific form that is predetermined, the target determination unit has a determination result different from a determination result obtained in a case where the specific character string is recorded in a form different from the specific form.

4. The document processing apparatus according to claim 1,
wherein the target determination unit determines whether to use the image as the keyword extraction target by using a determination condition identified in accordance with a type of the process executed by the image processing unit.

5. The document processing apparatus according to claim 1,
wherein the keyword extraction unit extracts the keyword by using an extraction condition identified in accordance with a type of the process executed by the image processing unit.

6. The document processing apparatus according to claim 1,
wherein the keyword extraction unit performs weighting on the extracted keyword in accordance with a type of the process executed by the image processing unit.

7. The document processing apparatus according to claim 1, wherein the processor when executing the instructions further comprises:
an authentication unit that performs authentication of an operator who causes the image processing unit to execute the process,
wherein the keyword extraction unit performs weighting on the extracted keyword in accordance with the operator identified by the authentication performed by the authentication unit.

8. The document processing apparatus according to claim 1, further comprising:
a plurality of interfaces that are each used for acquiring an image to be processed,
wherein the keyword extraction unit performs weighting on the extracted keyword in accordance with a type of one of the plurality of interfaces that is used for acquiring the image used as the keyword extraction target.

9. The document processing apparatus according to claim 1, wherein the processor when executing the instructions further comprises:
a management unit that manages information regarding the keyword extracted by the keyword extraction unit; and
a communication unit that is used for exchanging data with a different document processing apparatus,
wherein the management unit acquires, via the communication unit, information regarding a keyword extracted by the different document processing apparatus and manages the information together with the information regarding the keyword extracted by the extraction unit of the document processing apparatus.

10. A non-transitory computer readable medium storing a program causing a computer to execute a process comprising:
processing an image;
determining whether an image to be processed is to be used as a keyword extraction target;
reading a text from the image processed; and
extracting a keyword from the text read from an image determined to be a keyword extraction target.

* * * * *